(12) United States Patent
Takenaka et al.

(10) Patent No.: US 9,654,697 B2
(45) Date of Patent: May 16, 2017

(54) SOLID-STATE IMAGING APPARATUS AND DRIVING METHOD OF SOLID-STATE IMAGING APPARATUS

(71) Applicant: CANON KABUSHIKI KAISHA, Tokyo (JP)

(72) Inventors: Shintaro Takenaka, Yokohama (JP); Kazuhiro Sonoda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 17 days.

(21) Appl. No.: 13/973,333

(22) Filed: Aug. 22, 2013

(65) Prior Publication Data
US 2014/0078358 A1    Mar. 20, 2014

(30) Foreign Application Priority Data
Sep. 14, 2012  (JP) .................................. 2012-203195

(51) Int. Cl.
*H04N 5/235* (2006.01)

(52) U.S. Cl.
CPC ......... *H04N 5/2353* (2013.01); *H04N 5/2357* (2013.01)

(58) Field of Classification Search
USPC .............................. 348/226.1–228.1, 363–365
See application file for complete search history.

(56) References Cited

U.S. PATENT DOCUMENTS

| | | | |
|---|---|---|---|
| 7,990,448 B2 | 8/2011 | Sonoda .......................... 348/294 |
| 7,999,866 B2 | 8/2011 | Sonoda et al. ................ 348/245 |
| 8,035,712 B2 | 10/2011 | Sonoda .......................... 348/294 |
| 8,049,799 B2 | 11/2011 | Sonoda et al. ................ 348/294 |
| 8,081,246 B2 | 12/2011 | Takenaka ....................... 348/307 |
| 8,085,324 B2 | 12/2011 | Sonoda .......................... 348/294 |
| 8,094,220 B2 | 1/2012 | Sonoda .......................... 348/294 |
| 8,139,132 B2 | 3/2012 | Sonoda .......................... 348/302 |
| 8,305,473 B2 | 11/2012 | Takenaka et al. ............ 348/300 |
| 8,363,137 B2 | 1/2013 | Sonoda et al. ................ 348/302 |
| 2006/0232686 A1* | 10/2006 | Ono ....................... H04N 5/235 348/226.1 |
| 2010/0201856 A1 | 8/2010 | Hayashi et al. .............. 348/296 |
| 2011/0157425 A1* | 6/2011 | Nakayama .................... 348/234 |
| 2011/0221930 A1* | 9/2011 | Katsumata ................. 348/226.1 |

(Continued)

FOREIGN PATENT DOCUMENTS

| | | |
|---|---|---|
| JP | 2004173016 A | 6/2004 |
| JP | 2004336153 A | 11/2004 |
| JP | 2007067736 A | 3/2007 |

(Continued)

*Primary Examiner* — Roberto Velez
*Assistant Examiner* — Yih-Sien Kao
(74) *Attorney, Agent, or Firm* — Fitzpatrick, Cella, Harper & Scinto

(57) ABSTRACT

A solid-state imaging apparatus includes: a pixel unit (1) configured to perform imaging of a plurality of frames by a photoelectric conversion; an exposure amount calculating unit (9) configured to calculate exposure amounts of the plurality of frames imaged in a flicker cycle of a light source; and a control unit (12) configured to control the exposure amount of each of the frames imaged by the pixel unit based on the exposure amounts of the plurality of frames calculated by the exposure amount calculating unit.

10 Claims, 13 Drawing Sheets

(56) References Cited

U.S. PATENT DOCUMENTS

2011/0273546 A1* 11/2011 Lin et al. .................. 348/61
2012/0194698 A1* 8/2012 Cami ..................... 348/226.1

FOREIGN PATENT DOCUMENTS

| JP | 2007215062 A | | 8/2007 |
|---|---|---|---|
| JP | 2008109253 A | * | 5/2008 |
| JP | 2009-017167 A | | 1/2009 |
| JP | 2011-176622 A | | 9/2011 |

* cited by examiner

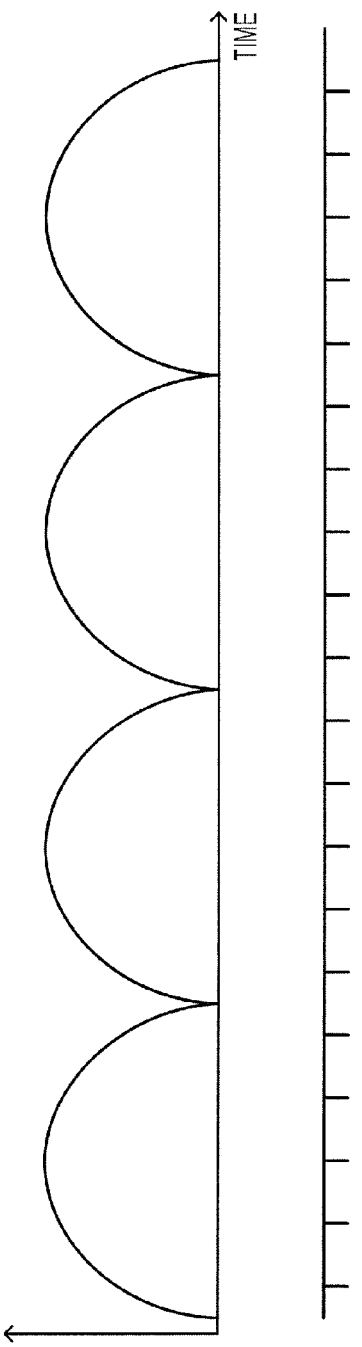
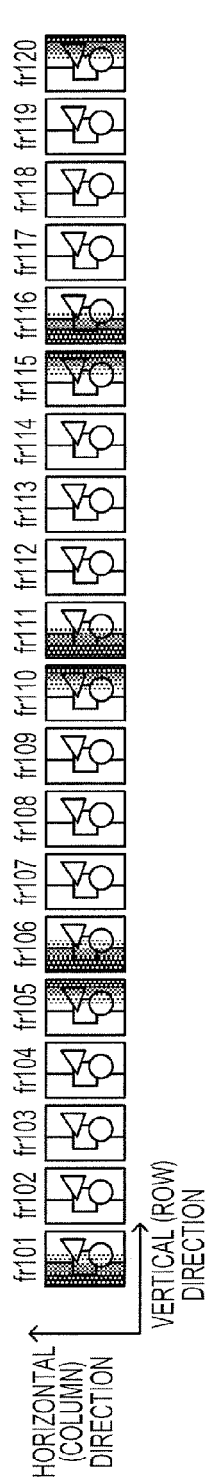
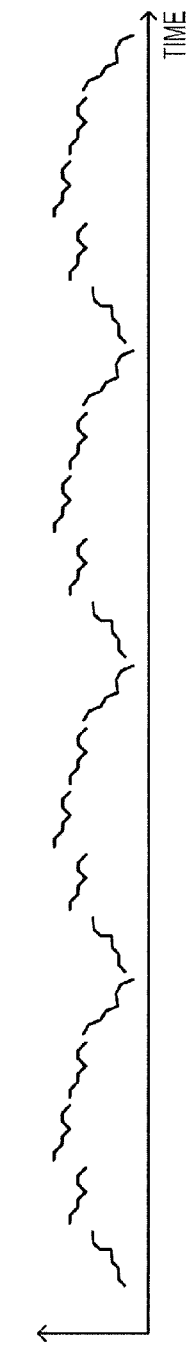
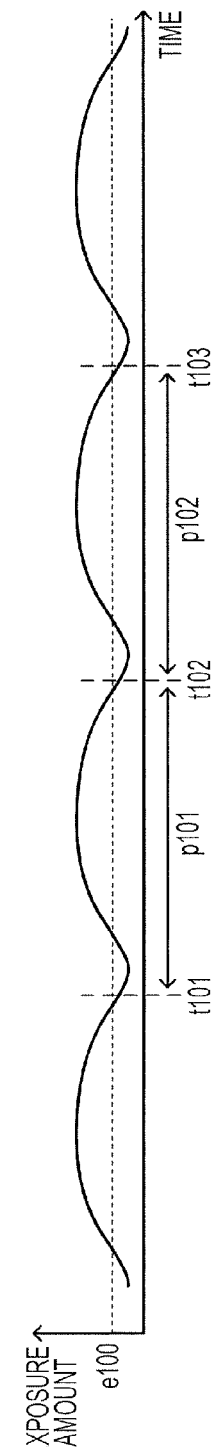
FIG. 3A CHANGE OF LIGHT SOURCE LUMINANCE
FIG. 3B VERTICAL SYNCHRONIZING SIGNAL
FIG. 3C OUTPUT IMAGE
FIG. 3D AVERAGE LUMINANCE OF EACH ROW IN OUTPUT IMAGE
FIG. 3E EXPOSURE AMOUNT OF EACH ROW IN OUTPUT IMAGE

CHANGE OF LIGHT
SOURCE LUMINANCE

VERTICAL SYNCHRONIZING
SIGNAL

OUTPUT IMAGE

AVERAGE LUMINANCE OF
EACH ROW IN OUTPUT IMAGE

EXPOSURE AMOUNT OF
EACH ROW AND AREAL
MEAN EXPOSURE AMOUNT

CHANGE OF LIGHT
SOURCE LUMINANCE

VERTICAL SYNCHRONIZING
SIGNAL

GAIN CALCULATED BASED ON
EXPOSURE AMOUNT OF EACH
FRAME

OUTPUT IMAGE

AVERAGE LUMINANCE
OF EACH ROW IN
OUTPUT IMAGE

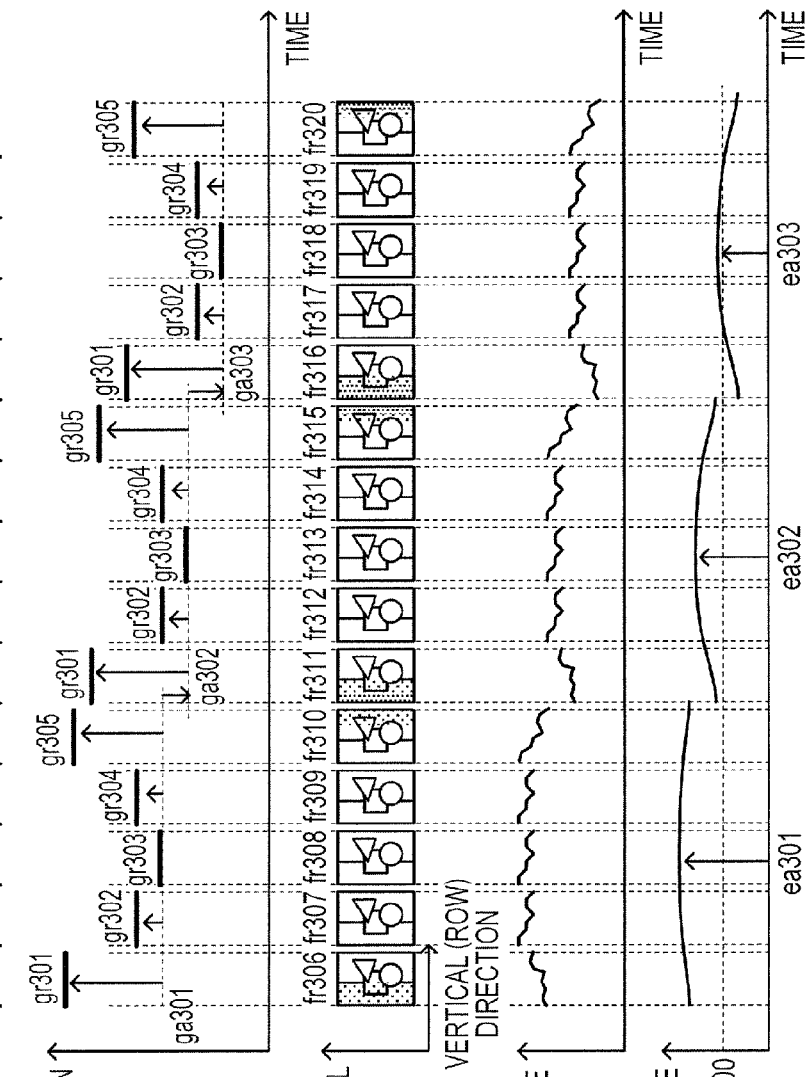
FIG. 6A CHANGE OF LIGHT SOURCE LUMINANCE
FIG. 6B VERTICAL SYNCHRONIZING SIGNAL
FIG. 6C GAIN CALCULATED BASED ON EXPOSURE AMOUNT OF EACH FRAME
FIG. 6D OUTPUT IMAGE
FIG. 6E AVERAGE LUMINANCE OF EACH ROW IN OUTPUT IMAGE
FIG. 6F EXPOSURE AMOUNT OF EACH ROW IN OUTPUT IMAGE

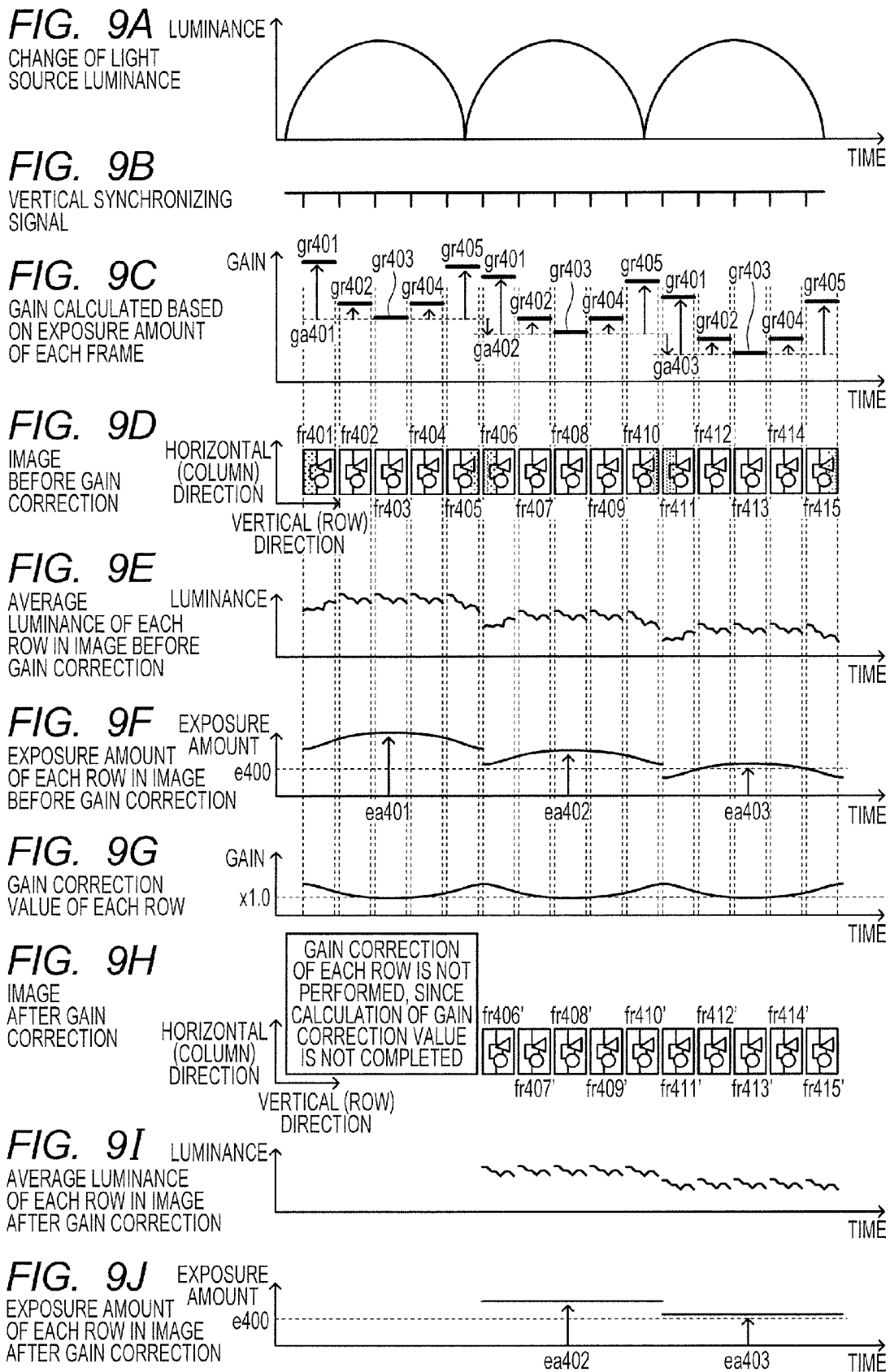

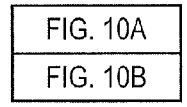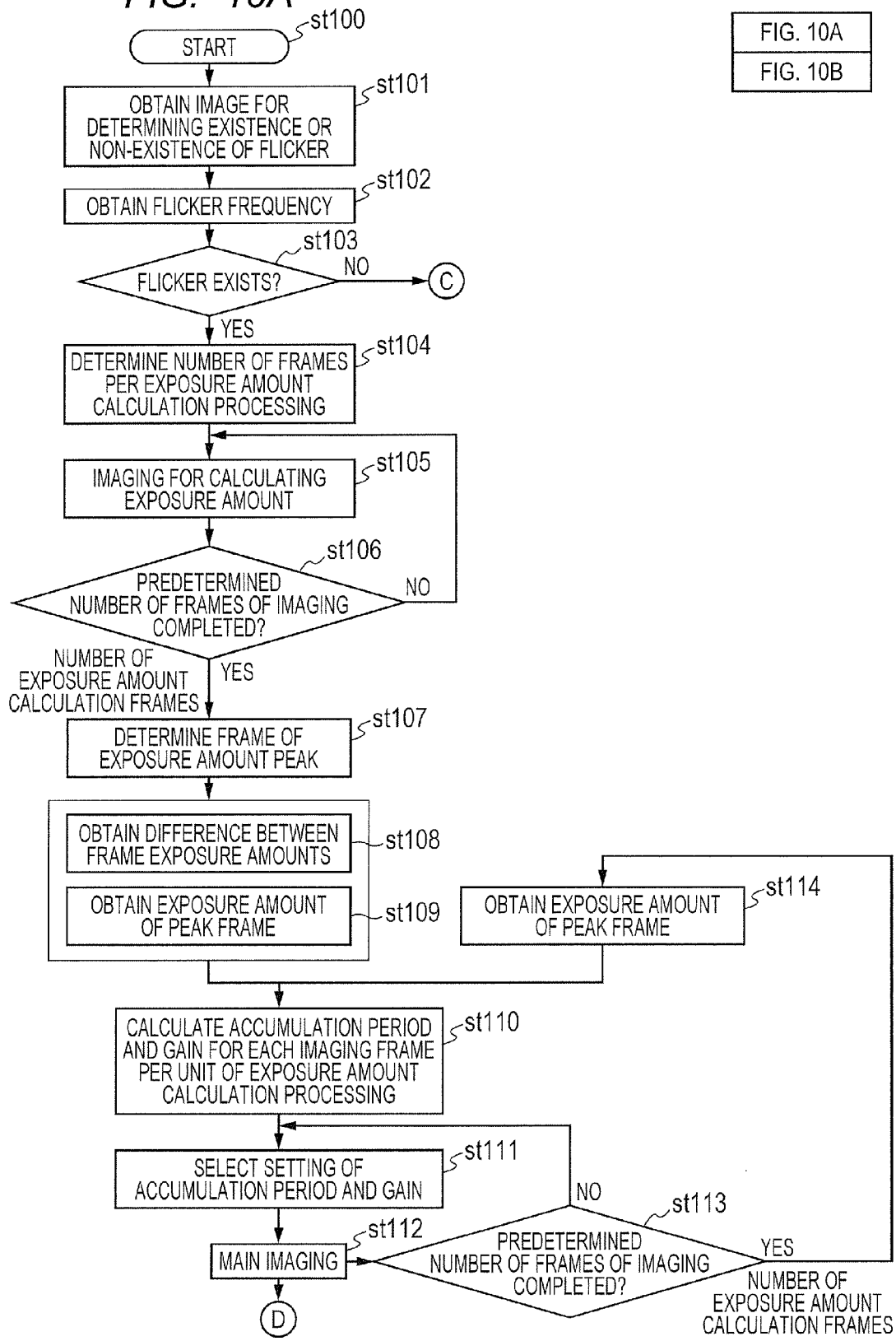

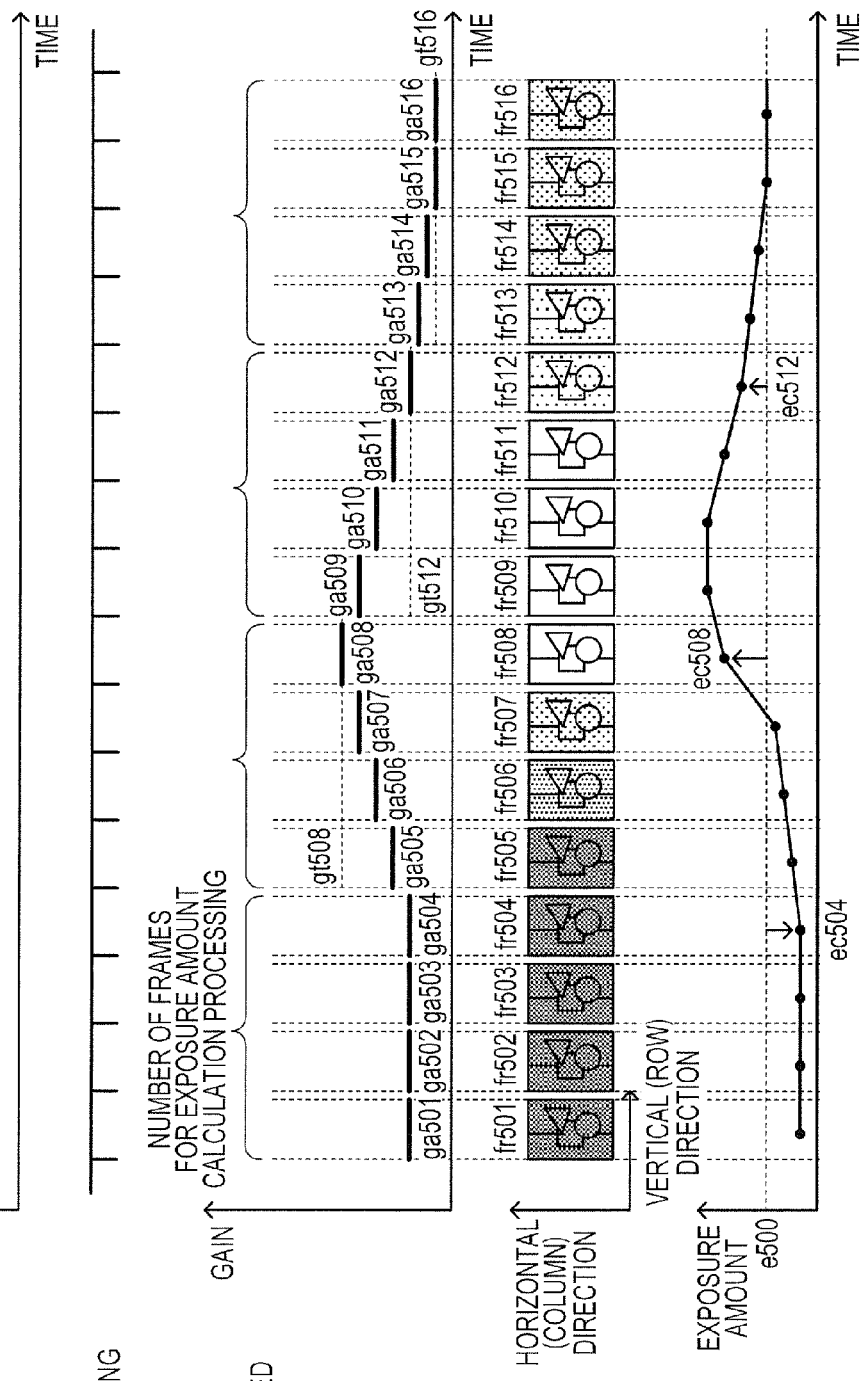
FIG. 11A CHANGE OF LIGHT SOURCE LUMINANCE
FIG. 11B VERTICAL SYNCHRONIZING SIGNAL
FIG. 11C GAIN CALCULATED BASED ON EXPOSURE AMOUNT OF EACH FRAME
FIG. 11D OUTPUT IMAGE
FIG. 11E AREA MEAN EXPOSURE AMOUNT

SOLID-STATE IMAGING APPARATUS AND DRIVING METHOD OF SOLID-STATE IMAGING APPARATUS

BACKGROUND OF THE INVENTION

Field of the Invention

The present invention relates to a solid-state imaging apparatus such as an electronic camera, and a driving method of the solid-state imaging apparatus.

Description of the Related Art

In an imaging apparatus provided with an XY-address scanning type of imaging element, a rolling shutter method is employed which controls a charge accumulation period of a photoelectric conversion element for every line by addressing. When moving images have been photographed by using this rolling shutter method under a fluorescent lamp, there is the case where unevenness in stripe along a row (hereafter referred to as flicker) appears in the image due to the influence of the periodic change of luminance by flicker frequency of the light source (for instance, frequency of 50 Hz or 60 Hz in commercial power supply) of the fluorescent lamp. For this reason, Japanese Patent Application Laid-Open No. 2011-176622 proposes an imaging apparatus which calculates the flicker frequency of a light source from the photographed image, and reduces the flicker based on the flicker frequency.

There is the case where the imaging apparatus according to Japanese Patent Application Laid-Open No. 2011-176622 cannot set the charge accumulation period at the integral multiple of the half cycle of the flicker frequency, in the case of moving images in which the frame rate is so high as the read-out time for one screen becomes shorter than the flicker cycle of the light source (for instance, in case of moving images of 1,000 fps). In this case, the flicker cannot be reduced.

SUMMARY OF THE INVENTION

According to an aspect of the present invention, a solid-state imaging apparatus comprises: a pixel unit configured to perform imaging of a plurality of frames by a photoelectric conversion; an exposure amount calculating unit configured to calculate exposure amounts of the plurality of frames imaged under an effect of a flicker frequency of a light source; and a control unit configured to control the exposure amount of each of the frames imaged by the pixel unit based on the exposure amounts of the plurality of frames calculated by the exposure amount calculating unit.

Further features of the present invention will become apparent from the following description of exemplary embodiments with reference to the attached drawings.

BRIEF DESCRIPTION OF THE DRAWINGS

FIGS. 3A, 3B, 3C, 3D and 3E are views describing a process of obtaining a flicker frequency in the first embodiment.

FIGS. 6A, 6B, 6C, 6D, 6E and 6F are views describing one example of a control of an exposure amount.

FIGS. 9A, 9B, 9C, 9D, 9E, 9F, 9G, 9H, 9I and 9J are views describing one example of a process of obtaining a gain correction value for each row and controlling the exposure amount.

FIGS. 11A, 11B, 11C, 11D and 11E are views describing one example of a control of an exposure amount.

DESCRIPTION OF THE EMBODIMENTS

Preferred embodiments of the present invention will now be described in detail in accordance with the accompanying drawings.

First Embodiment

In the first embodiment of the present invention, a plurality of frames in a flicker cycle is determined to be one unit of an exposure amount calculation and an exposure amount correction. The solid-state imaging apparatus calculates an accumulation period or a gain of each frame in the one unit for the calculation of the exposure amount, which is to be imaged next time, from the exposure amount of each frame in the one unit. Then, by using the calculated result, the solid-state imaging apparatus images an image, corrects the gain, and reduces the influence of the flicker among the frames. The exposure amount is determined by the intensity (or luminance) of outside light, an accumulation period in a pixel, and a gain, and can be expressed by (intensity of outside light)×(accumulation period)×(gain). One aspect of the calculation of the exposure amount is that the solid-state imaging apparatus calculates the intensity of the outside light from the image data obtained by imaging, by using the exposure period at the time of imaging and the gain. In addition, the present embodiment shows a method of determining an average value of the whole pixel data in one frame as an average exposure amount in one frame, fixing the accumulation period so that the average exposure amount in one frame becomes a certain exposure amount (in other words, appropriate exposure amount), and adjusting the gain, as one example of a method of adjusting exposure amount. When a frame rate is rapid, it is desirable to set the accumulation period at the maximum accumulation period which can be employed in the frame rate in order to obtain an adequate image, and accordingly the accumulation period has been determined so as to be fixed. However, it is acceptable to adjust the accumulation period as a measure to finely adjust the exposure amount.

Figure 1:
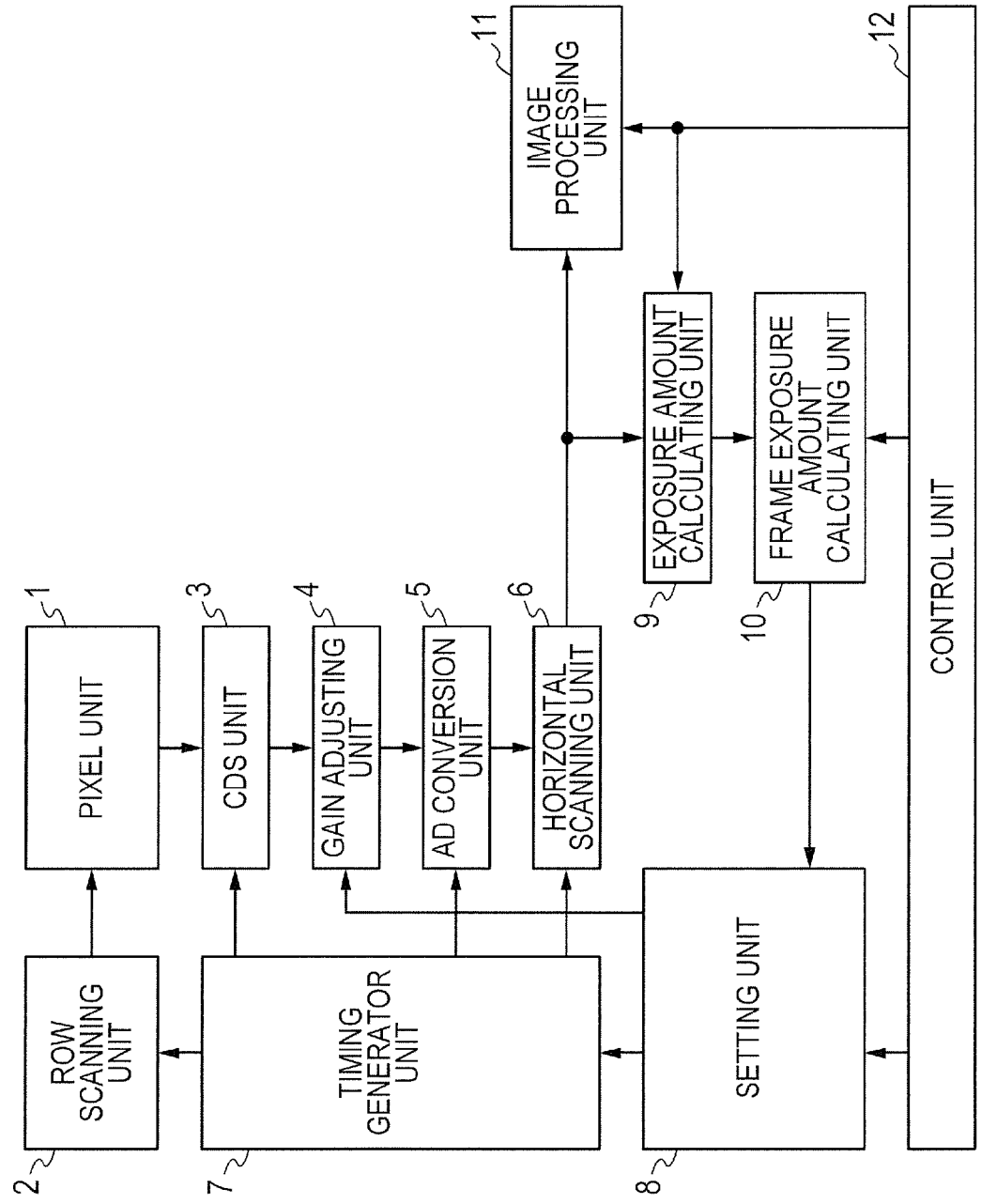
FIG. 1 is a block diagram illustrating a configuration example of a solid-state imaging apparatus.

FIG. 1 is a block diagram illustrating one configuration example of the solid-state imaging apparatus according to the first embodiment of the present invention. In a pixel unit 1, a plurality of pixels each of which contains a photoelectric conversion element is arranged in a matrix form, and the pixel unit 1 performs the imaging of a plurality of frames by photoelectric conversion. A row scanning unit 2 is arranged adjacent to the pixel unit 1, and scans the rows of the pixels in the pixel unit 1. The row scanning unit reads out an electric charge accumulated in each of the pixels in the pixel unit 1 and performs an electronic shutter operation which controls the charge accumulation period in the pixel unit 1. A CDS unit 3 performs a correlation double sampling (hereafter referred to as CDS) to the pixel output signal from the pixel unit 1, and subtracts a pixel reset noise which is superimposed on the pixel output signal. A gain adjusting unit 4 adjusts the gain to the analog signal after CDS. A gain adjusting function may be given to the CDS unit 3, in place of the gain adjusting unit 4. Alternatively, the gain adjusting function may be given to an AD converter unit 5 which will be described later. The AD converter unit 5 converts an analog signal after CDS to a digital signal. A horizontal scanning unit 6 sequentially transfers the digital signal of each column to an image processing unit 11 and an exposure amount calculating unit 9. A timing generator unit 7 generates timing signals which control the row scanning unit 2, the CDS unit 3, the AD converter unit 5, and the horizontal scanning unit 6. The timing generator unit 7 also has a function of controlling the accumulation period in the pixel by controlling an interval between the starting time of an electronic shutter scan and the starting time of reading out scan, in the row scanning unit 2. A setting unit 8 holds the timing setting of the timing generator unit 7 and the gain setting of the gain adjusting unit 4. An exposure amount calculating unit 9 calculates exposure amounts of the plurality of frames, based on the image data of the plurality of frames which become one unit of the calculation of the exposure amounts output from the horizontal scanning unit 6. A frame exposure amount calculating unit 10 calculates the accumulation period and the gain of each frame in the plurality of frames which becomes one unit of the calculation of the exposure amount and which is to be imaged next time, based on the exposure information which has been obtained in the exposure amount calculating unit 9. An image processing unit 11 performs various types of image processings (gradation conversion processing, edge enhancement processing and the like). A control unit 12 controls the setting unit 8, the exposure amount calculating unit 9, the frame exposure amount calculating unit 10 and the image processing unit 11.

Figure 2:
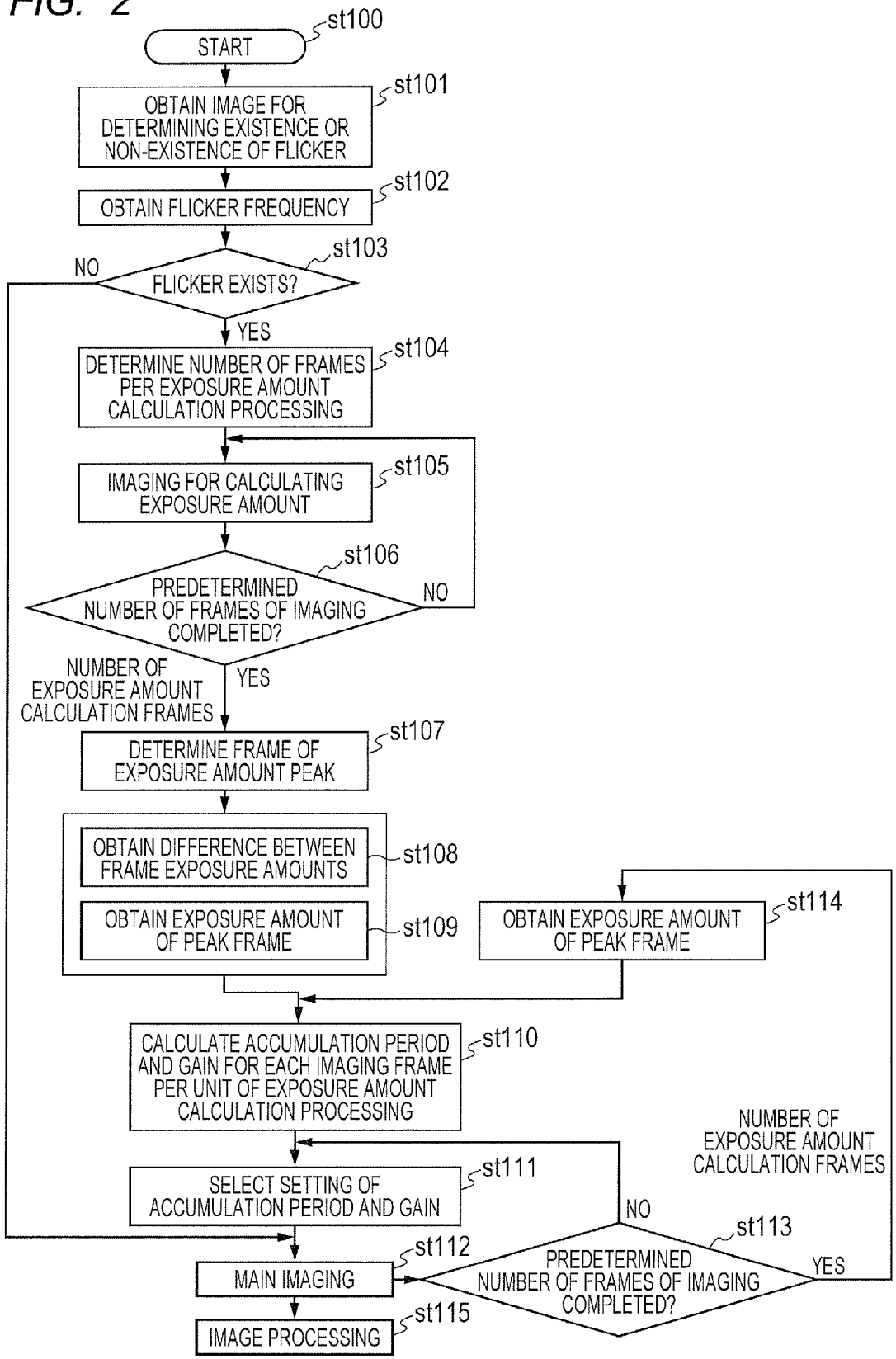
FIG. 2 is a flow chart illustrating an operation example of a solid-state imaging apparatus of a first embodiment.

Next, one example of an operation of the solid-state imaging apparatus according to the present embodiment will be described below with reference to the flow chart of FIG. 2 and FIG. 3A to FIG. 6F. Firstly, the operation for obtaining the flicker frequency will be described below. FIG. 2 is a flow chart illustrating a driving method of the solid-state imaging apparatus.

When the solid-state imaging apparatus starts photographing in a step st100, the solid-state imaging apparatus obtains an image for determining the existence or non-existence of the flicker in a step st101, and obtains the flicker frequency in a step st102. One example of operations of the steps st101 and st102 will be described in more detail with reference to FIGS. 3A to 3E. FIG. 3A illustrates a change of light source luminance, FIG. 3B illustrates a vertical synchronizing signal to be input into the timing generator unit 7, and FIG. 3C illustrates the images output from the horizontal scanning unit 6. In addition, FIG. 3D illustrates an average luminance of each row in the output images, and FIG. 3E illustrates the exposure amount of each row in the output images, which has been calculated from FIG. 3E.

In the step st101, the control unit 12 photographs an image for four cycles or more with a frame rate of 3×Ff (fps) or more, with respect to the frequency Ff (Hz) of the change of the light source luminance, which is assumed beforehand. In FIGS. 3A to 3E, an image is photographed for four cycles of the flicker with the frame rate of 5×Ff (fps) with respect to the frequency Ff (Hz) of the change of the light source luminance. This frame rate is desirably determined so as to be three frames or more in order to determine the existence or non-existence of the flicker. The number of the frames to be used for determining the existence or non-existence of the flicker ought to be determined according to the number of pixels and the number of the driving frequency of the solid-state imaging apparatus. As the number of the frames increases, an accuracy of the exposure correction is enhanced, in each imaging screen.

Next, in the step st102, the exposure amount calculating unit 9 determines an average luminance of each row in the image data which has been output from the horizontal scanning unit 6, further subtracts a spatial-frequency component of the average luminance of each row per unit of a frame from the average luminance of each row, and determines the exposure amount of each row. The exposure amount calculating unit 9 sets a threshold of the exposure amount, and when the time at which the exposure amount of each row is less than the threshold of the exposure amount appears three times or more and when each of intervals among the timings is a constant value, determines the interval as the flicker cycle. FIG. 3D illustrates an average luminance of each row in the output images, but the change of the luminance in one frame includes the spatial-frequency component of an object, which depends on the luminance of an article to be photographed. A frame fr103 having a high average luminance of the frame has little influence of the change of the light source luminance, and the change of the luminance in the frame is approximately the spatial-frequency component of the object. In other words, when a relative change of the luminance in the frame fr103 having the high average luminance of the frame is subtracted from the change of the luminance in each frame, the changing component of the exposure amount is obtained, in which the spatial-frequency component of the object has been removed in each frame, as is illustrated in FIG. 3E. When the threshold e100 of the exposure amount is set for the exposure amount of each frame, the exposure amounts of the frames are less than the threshold e100 of the exposure amount, at the times t101, t102 and t103 in FIG. 3E. When an interval p101 between the times t101 and t102 and an interval p102 between the times t102 and t103 are equal, it is determined that there is a periodic change of the luminance of the light source. Thus, the flicker frequency is obtained based on the time interval p101.

After the step st102, in the step st103, the exposure amount calculating unit 9 determines the existence or non-existence of the flicker. Specifically, the exposure amount calculating unit 9 determines the existence or non-existence of a periodic change (flicker) of the luminance of the light source, based on the exposure amounts of the plurality of frames. When there has been no flicker, the control unit 12 starts main imaging in a step st112, and when there has been a flicker, the exposure amount calculating unit 9 determines the number of the frames with which the exposure amount calculating unit 9 performs the exposure amount calculation processing, in a step st104.

In the step st104, when N is defined as an integer of 3 or more, the exposure amount calculating unit 9 determines the frame rate as N×Ff (fps) with respect to the flicker frequency Ff (Hz), and determines to perform the exposure amount calculation processing once for the N frames.

Subsequently, the imaging for calculating the exposure amount, which is performed in advance of the main imaging, and an operation of the calculation of the exposure amount, will be described below. In a step st105, the control unit 12 performs the imaging for calculating the exposure amount. Next, in a step st106, the control unit 12 determines whether the imaging of the N frames has been completed or not, and if the imaging is not completed, the operation returns to the step st105. After the imaging of the N frames has been completed, in a step st107, the exposure amount calculating unit 9 determines the frame of a peak exposure amount. Next, in a step st108, the exposure amount calculating unit 9 calculates difference between the exposure amount of each frame and the exposure amount of the peak frame. Next, in a step st109, the exposure amount calculating unit 9 obtains the absolute exposure amount of the frame of the peak exposure amount. One example of operations of the steps st105, st106, st107, st108 and st109 will be described in more detail below with reference to FIGS. 4A to 4E.

Figure 4A:
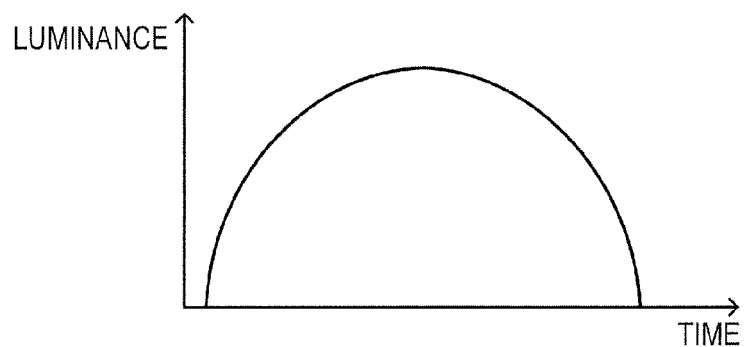
FIGS. 4A, 4B, 4C, 4D and 4E are views describing one example of a process of obtaining difference among exposure amounts.
Figure 4B:
Figure 4C:
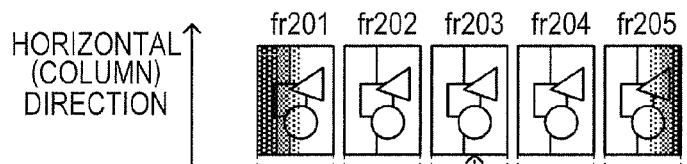
Figure 4D:
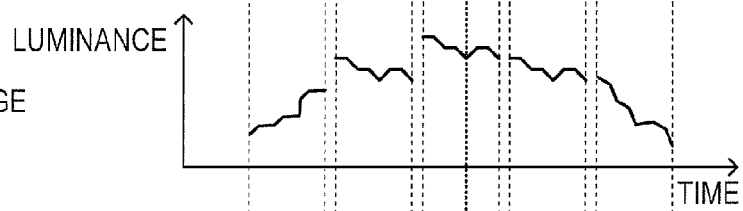
Figure 4E:
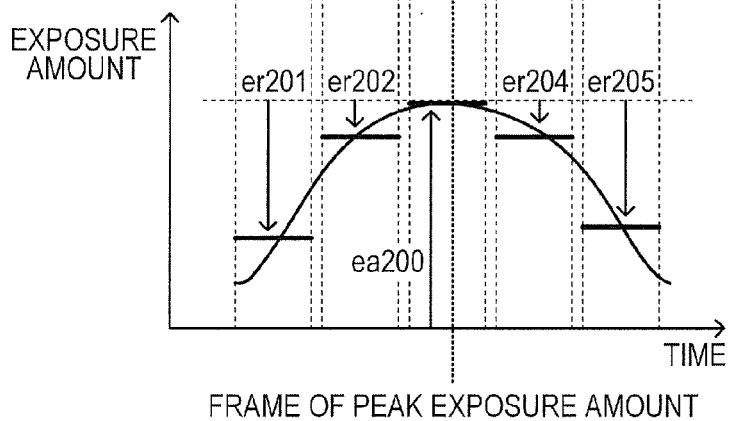

FIG. 4A illustrates the change of the light source luminance, FIG. 4B illustrates a vertical synchronizing signal to be input into the timing generator unit 7, and FIG. 4C illustrates images output from the horizontal scanning unit 6. In addition, FIG. 4D illustrates the average luminance of each row in the output images, and FIG. 4E illustrates the exposure amount of each row in the output images, which has been calculated from FIG. 4D.

In the steps st105 and st106, the control unit 12 starts imaging with the frame rate which has been determined in the step st104. In FIGS. 4A to 4E, the imaging is performed with the frame rate of 5×Ff (fps) with respect to the flicker frequency Ff (Hz). After the imaging of five frames in the flicker cycle of the light source has been completed, in other words, after the imaging of the number of frames for the exposure amount calculation has been completed, the exposure amount calculating unit 9 determines the frame of the peak exposure amount, in the step st107. The exposure amount calculating unit 9 determines the average luminance of each row illustrated in FIG. 4D, of the image data which has been output from the horizontal scanning unit 6, subtracts the spatial-frequency component of the average luminance of each row per unit of the frame from the average luminance of each row, and determines the exposure amount of each row, which is illustrated in FIG. 4E. Then, the exposure amount calculating unit 9 determines the average exposure amount of each frame from the exposure amount of each row, and determines a frame having the highest average exposure amount as the frame of the peak exposure amount. In FIG. 4E, an average exposure amount per one frame of a frame fr203 is the peak, and the frame fr203 is determined as the frame of the peak exposure amount.

Next, in a step st108, the exposure amount calculating unit 9 calculates the difference between the exposure amounts of each frame and the peak frame, on each frame in the flicker cycle of the light source. In FIG. 4E, the difference between the exposure amounts of the frame fr201 and the frame fr203 of the peak exposure amount is shown as er201. Similarly, the exposure amount calculating unit 9 calculates the difference between the exposure amounts of other frames and the frame fr203 of the peak exposure amount, and memorizes the results.

In addition, in a step st109, the exposure amount calculating unit 9 obtains the exposure amount of the frame of the peak exposure amount. In FIG. 4E, an exposure amount ea200 of the frame fr203 is determined to be the exposure amount of the frame of the peak exposure amount.

Subsequently, the calculation of the exposure amount of each frame in the number of the exposure amount calculation frames in the main imaging, which uses the above described difference between the exposure amounts of the frame of the peak exposure amount and each frame in the number of exposure amount calculation frames, and an operation of the main imaging will be described below.

In a step st110, a frame exposure amount calculating unit 10 calculates an accumulation period and a gain for each frame per unit of exposure amount calculation processing. Then, in a step st111, a control unit 12 selects the settings of the accumulation period and the gain for each frame, which have been calculated in the step st110, and performs the main imaging in a step st112. One example of operations of the steps st110, st111 and st112 will be described in more detail below with reference to FIGS. 5A to 5E.

Figure 5A:
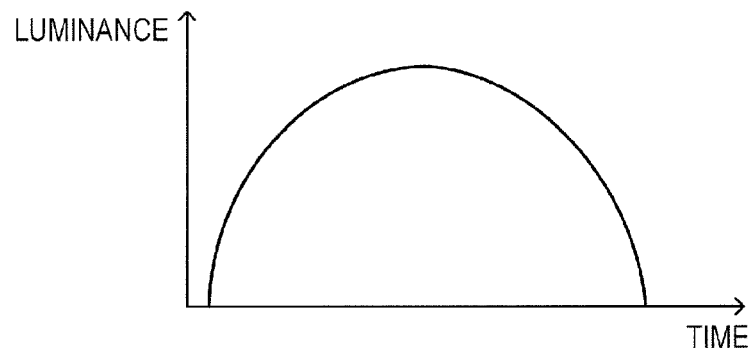
FIGS. 5A, 5B, 5C, 5D and 5E are views describing one example of calculating gains of each frame and selecting the setting of the gains.
Figure 5B:
Figure 5C:
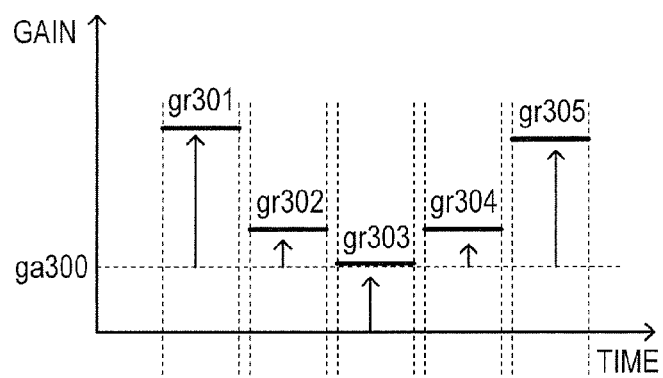
Figure 5D:
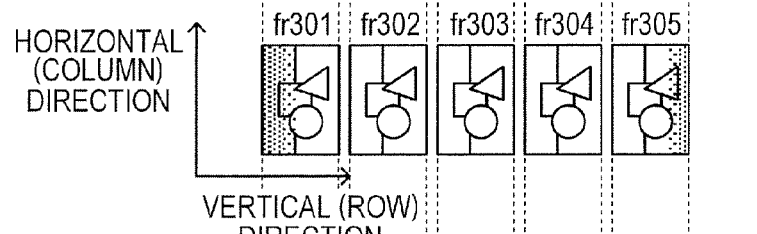
Figure 5E:
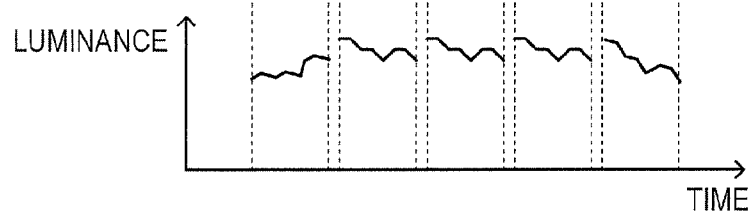

FIG. 5A illustrates a change of the light source luminance, FIG. 5B illustrates a vertical synchronizing signal to be input into a timing generator unit 7, and FIG. 5C illustrates a gain value of each frame, which has been calculated by the frame exposure amount calculating unit 10. FIG. 5D illustrates the images which have been imaged with the gains illustrated in FIG. 5C and are output from the horizontal scanning unit 6, and FIG. 5E illustrates an average luminance of each row in the output images.

In the step st110, the frame exposure amount calculating unit 10 calculates relative gains gr301 to gr305, which are illustrated in FIG. 5C, from differences er201 to er205 between exposure amounts of the respective frames and the frame of the peak exposure amount, which have been calculated in the exposure amount calculating unit 9 (FIG. 4E). Next, the frame exposure amount calculating unit 10 calculates an absolute gain ga300 illustrated in FIG. 5C from the exposure amount ea200 of the frame of the peak exposure amount, which has been calculated in the exposure amount calculating unit 9. Then, the frame exposure amount calculating unit 10 adds an absolute gain ga300 to relative gains gr301 to gr305, and determines the values as the gains of the respective frames.

Then, before a frame fr301 in FIG. 5D is imaged, the control unit 12 selects gr301+ga300 as the setting of the gain in a step st111, and performs imaging with the setting of the gain in a step st112. Similarly, before frames fr302 to fr305 are imaged, the control unit 12 selects the setting of the gains illustrated in FIG. 5C, and performs the imaging.

Finally, an operation of the automatic exposure control for every number of the exposure amount calculation frames will be described below. After the imaging of the number of exposure calculation frames has been completed in a step st113, the exposure amount calculating unit 9 obtains the exposure amount of the frame of the peak exposure amount from the image data obtained after the imaging has been completed in a step st114. Then, in the step st110, the frame exposure amount calculating unit 10 calculates the accumulation period and the gain for each frame per unit of the exposure amount calculation processing. Then, in the step st111, the control unit 12 selects the settings of the accumulation period and the gain for each frame, which have been calculated in the step st110, and performs the main imaging in the step st112. One example of operations of the steps st113, st114, st110, st111 and st112 will be described in more detail below with reference to FIGS. 6A to 6F.

FIG. 6A illustrates a change of the light source luminance, FIG. 6B illustrates a vertical synchronizing signal to be input into the timing generator unit 7, and FIG. 6C illustrates the gain value of each frame, which has been calculated by the frame exposure amount calculating unit 10. FIG. 6D illustrates the images which have been imaged with the gains illustrated in FIG. 6C and are output from the horizontal scanning unit 6, FIG. 6E illustrates an average luminance of each row in the output images, and FIG. 6F illustrates an exposure amount of each row in the output images.

In FIGS. 6A to 6F, the number of the exposure calculation frames is 5. After the control unit 12 has completed the imaging of frames fr306 to fr310 in FIG. 6D in the step st113, the exposure amount calculating unit 9 obtains the exposure amount of the frame of the peak exposure amount in the step st114. In FIGS. 6A to 6F, the frame of the peak exposure amount is a frame fr308, and the exposure amount calculating unit 9 obtains an exposure amount ea301 in FIG. 6F, as the exposure amount. At this time, when the appropriate exposure amount is set at e300, the exposure amount of the exposure amount ea301 is excessive. Then, in the step st110, the frame exposure amount calculating unit 10 lowers the gain of the set absolute gain to ga302 from ga301, before the frame fr311 is imaged. Then, in the steps st111 and st112, the control unit 12 performs the imaging of the frame fr311 by using the added gain of the relative gain gr301 and the absolute gain ga302. After that, similarly, the control unit 12 performs the imaging of frames fr312 to fr315 with settings of the respective gains, in the steps st111 and st112. Then, when the control unit 12 has completed the imaging up to the frame fr315, the exposure amount calculating unit 9 obtains the exposure amount of the frame of the peak exposure amount again in the step st114. The exposure amount calculating unit 9 obtains the exposure amount ea302 of the frame fr313. The exposure amount of the exposure amount ea302 is excessive with respect to the appropriate exposure amount e300, and accordingly, in the step st110, the frame exposure amount calculating unit 10 lowers the gain of the set absolute gain to ga303 from ga302. Then, in the steps st111 and st112, the control unit 12 performs the imaging of frames fr316 to fr320 while selecting the setting of the gain for each frame, which has been calculated by the frame exposure amount calculating unit 10. Then, in a step st115, the image processing unit 11 performs various types of image processings (gradation conversion processing, edge enhancement processing and the like) with respect to the images obtained by the main imaging.

Incidentally, the above operation has been described by using one example in which an exposure adjusting unit performs exposure adjustment only by the gain control, but the exposure adjusting unit may perform the exposure adjustment only by the control of an exposure period (charge accumulation period), or also may use both of the gain control and the exposure period control.

As has been described above, the solid-state imaging apparatus according to the present embodiment has the periodic exposure-adjusting unit for a periodic change (flicker) of the luminance of the light source, and also has an automatic exposure unit which operates per unit of the cycle. An exposure amount calculating unit 9 calculates the exposure amounts of the plurality of frames which have been imaged within the flicker cycle of the light source. The control unit 12 controls the exposure amount (charge accumulation period in photoelectric conversion and/or amplifying gain of frame) of each of the frames which are imaged by the pixel unit 1, based on the exposure amounts of the plurality of the calculated frames. Thereby, it becomes easy to reduce the influence of the flicker even in moving images that are imaged with such a high frame rate as to read out the plurality of images in the flicker cycle. In addition, the exposure adjusting unit performs the exposure adjustment per unit of the plurality of images, accordingly the calculation amount of the calculation of the exposure amount for the automatic exposure decreases, and the solid-state imaging apparatus can reduce its power consumption as well.

Second Embodiment

The solid-state imaging apparatus according to the second embodiment of the present invention further performs the gain adjustment for each row prior to the image processing, in addition to the operation in the first embodiment, and further reduces the influence of the flicker within the frame plane.

Figure 7:
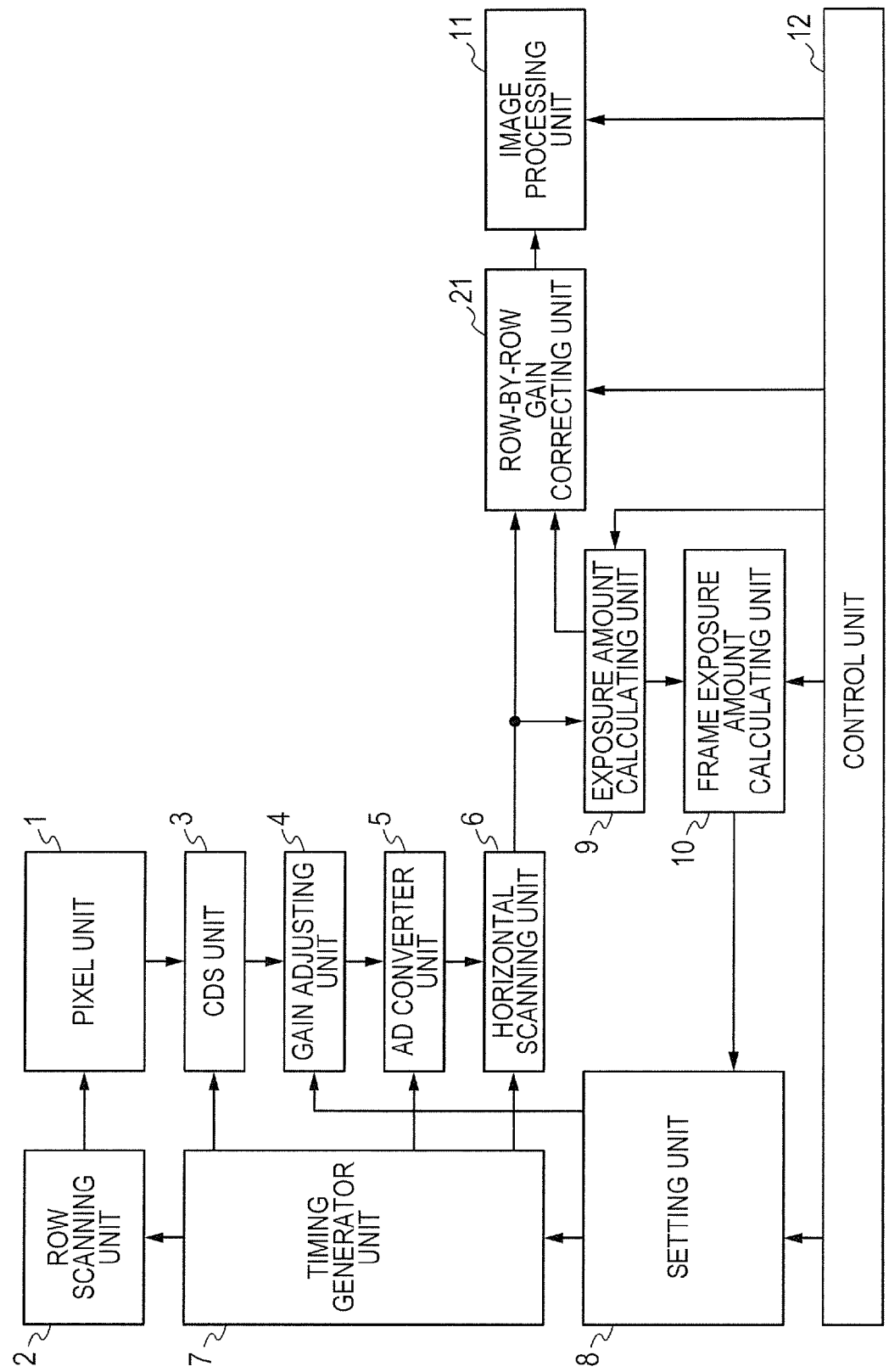
FIG. 7 is a block diagram illustrating a configuration example of a solid-state imaging apparatus of a second embodiment.
Figures 8, 8A, 8B:
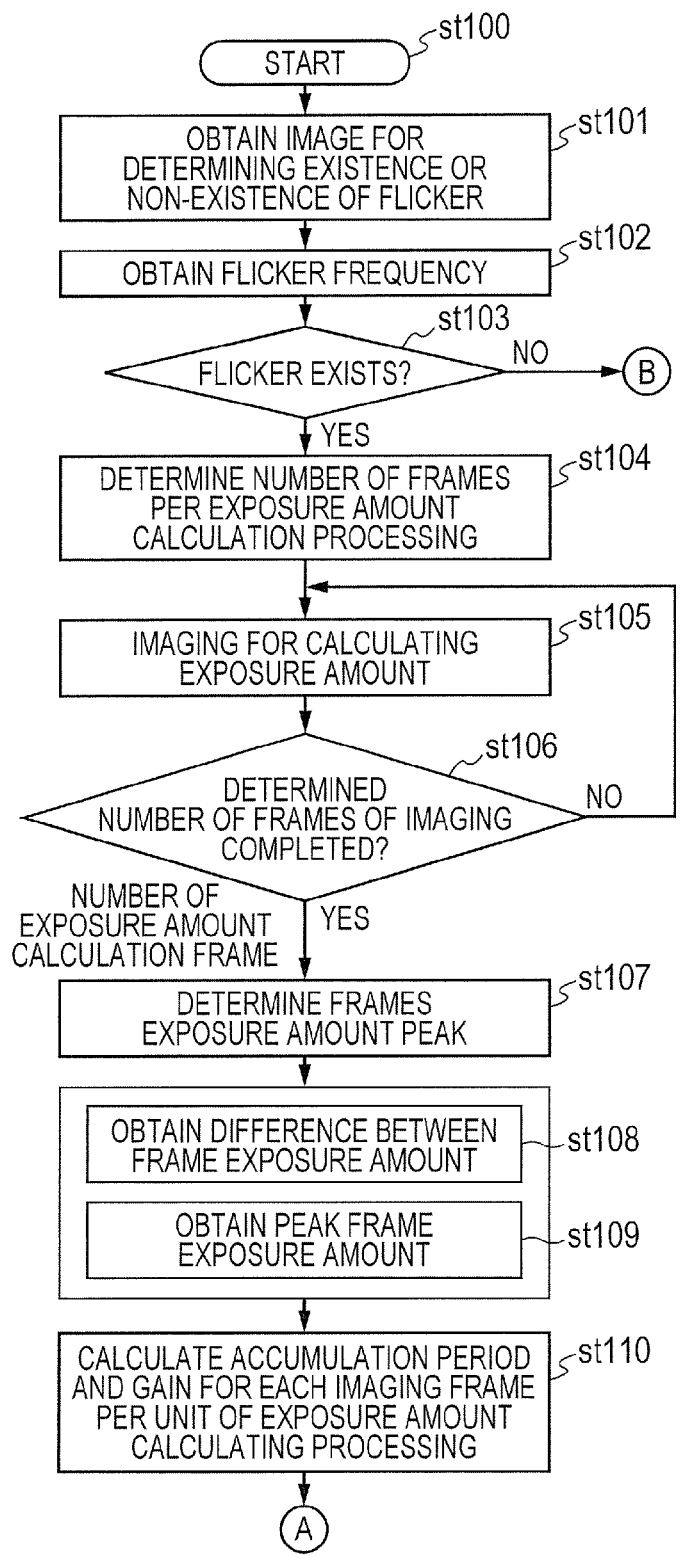
FIG. 8 which is comprised of FIGS. 8A and 8B are flow charts illustrating an operation example of the solid-state imaging apparatus of the second embodiment.
Figure 8B:
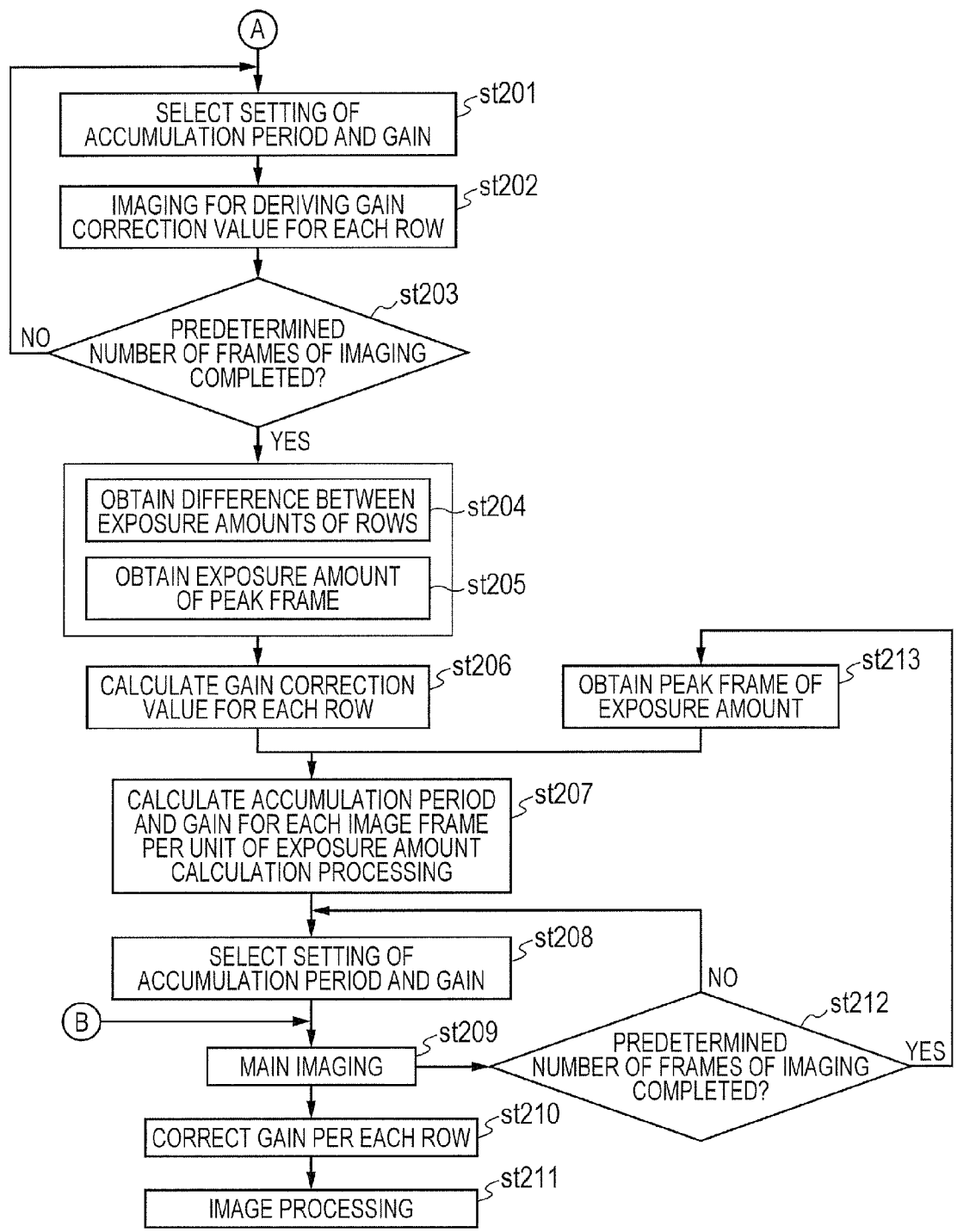
Figure 10B:
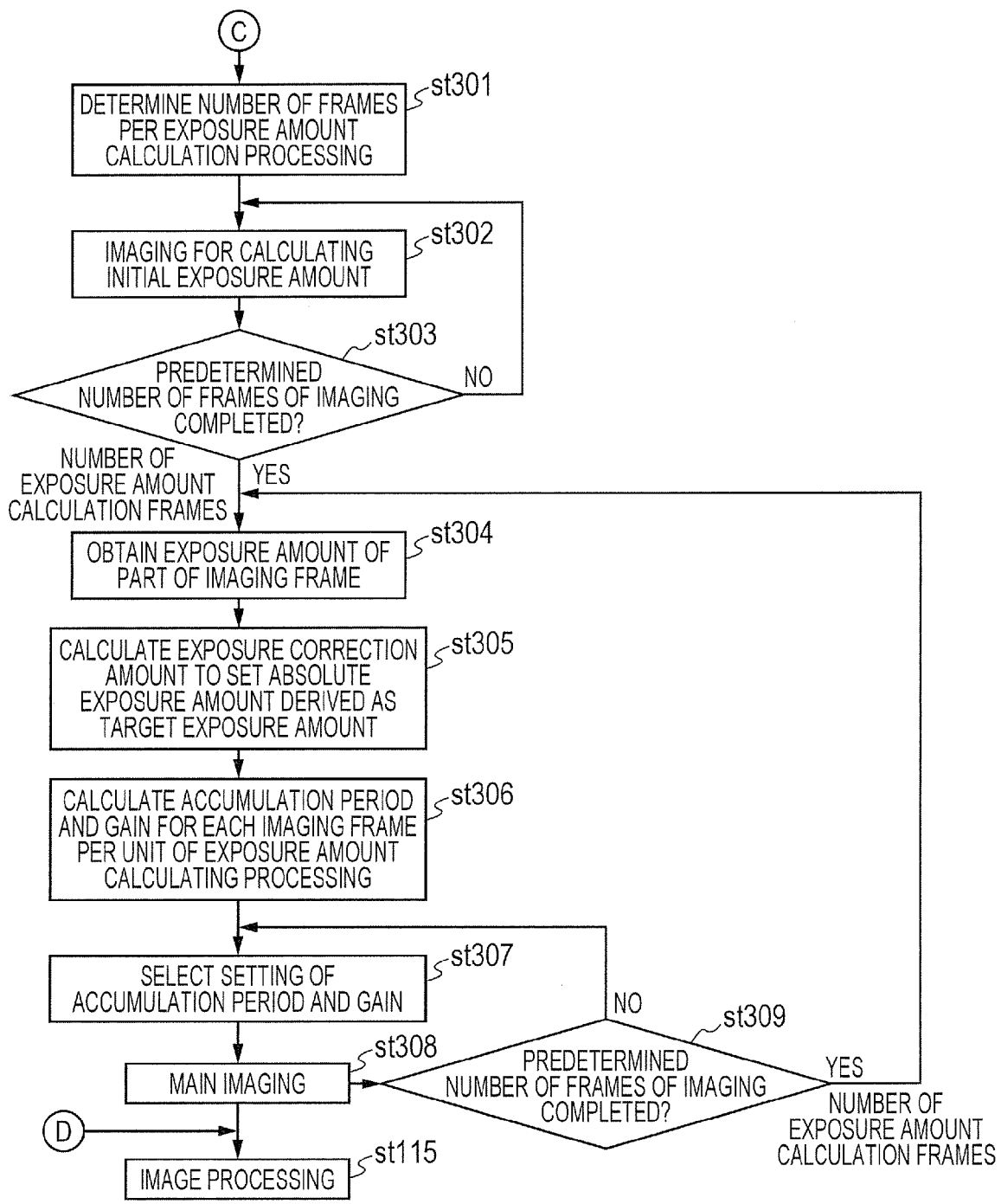
FIG. 10 which is comprised of FIGS. 10A and 10B are flow charts illustrating an operation example of a solid-state imaging apparatus of a third embodiment.

FIG. 7 is a block diagram illustrating one configuration example of the solid-state imaging apparatus according to the second embodiment of the present invention. Hereafter, mainly points of difference between the present embodiment and the first embodiment will be described. In the first embodiment, the exposure amount calculating unit 9 calculates an exposure amount of one frame from the image data corresponding to a plurality of imaging frames which have been output from the horizontal scanning unit 6, and from the exposure information, the frame exposure amount calculating unit 10 calculates the accumulation period and the gain of each frame in the plurality of frames. In addition, the image processing unit 11 performs various types of image processings, while using the image data which has been output from the horizontal scanning unit 6, as an input. On the other hand, in the solid-state imaging apparatus according to the present embodiment, which is illustrated in FIG. 7, a row-by-row gain correcting unit 21 performs gain correction per unit of a row, to the image data which has been output by the horizontal scanning unit 6, and furthermore the image processing unit 11 performs various types of image processings to the resultant data. The row-by-row gain correcting unit 21 calculates the gain correction value of each row based on the exposure information which the exposure amount calculating unit 9 has calculated.

Next, one example of an operation of the solid-state imaging apparatus according to the present embodiment will be described while focusing on the point of difference between the present embodiment and the first embodiment with reference to a flow chart of FIGS. 8A and 8B and FIGS. 9A to 9J. In a step st102, the exposure amount calculating unit 9 obtains a flicker frequency similarly to the first embodiment. Next, in a step st105, the control unit 12 performs the imaging for calculating the exposure amount. Next, in a step st107, the exposure amount calculating unit 9 determines the frame of the peak exposure amount. Next, in a step st108, the exposure amount calculating unit 9 obtains difference between the frame exposure amounts. Next, in a step st109, the exposure amount calculating unit 9 obtains the absolute exposure amount of the peak frame. Then, in a step st110, the frame exposure amount calculating unit 10 calculates the accumulation period and the gain for each imaging frame per unit of exposure amount calculation processing.

In the second embodiment, the row-by-row gain correcting unit further performs the gain correction per unit of a row. Hereafter, the imaging for obtaining the gain correction value of each row and the calculation for a gain correction value per each row by using the imaging result will be described, which are performed in advance of the main imaging. In the second embodiment, after the step st110, in order to obtain the gain correction value for each row, the control unit 12 selects the settings of the accumulation period and the gain for each frame, which have been calculated in the step st110, in a step st201, and performs imaging for obtaining the gain correction value for each row in a step st202. Then, when the number of imaging frames has reached the number of the exposure calculation frames in a step st203, the exposure amount calculating unit 9 obtains difference between exposure amounts of rows in a step st204, and obtains the exposure amount of the peak frame in a step st205. In a step st206, the row-by-row gain correcting unit 21 calculates the gain correction value of each row in each frame, from the difference between the exposure amounts of each row, which has been obtained in the step st204. One example of operations of the steps st110, st201 to st206 will be described in more detail with reference to FIGS. 9A to 9J.

FIG. 9A illustrates a change of the light source luminance, FIG. 9B illustrates a vertical synchronizing signal to be input into a timing generator unit 7, and FIG. 9C illustrates a gain value of each frame, which has been calculated by the frame exposure amount calculating unit 10. FIG. 9D illustrates the images which have been imaged with the gains illustrated in FIG. 9C and are output from the horizontal scanning unit 6, FIG. 9E illustrates an average luminance of each row in the output images, and FIG. 9F illustrates an exposure amount of each row in the output images. Then, FIG. 9G illustrates the gain correction value of each row, which is calculated by the row-by-row gain correcting unit 21.

In the step st110, the frame exposure amount calculating unit 10 calculates relative gains gr401 to gr405 illustrated in FIG. 9C from differences between exposure amounts of the respective frames and the frame of the peak exposure amount, which have been calculated in the exposure amount calculating unit 9. Next, the frame exposure amount calculating unit 10 calculates the absolute gain ga401 illustrated in FIG. 9C from the exposure amount of the frame of the peak exposure amount, which has been calculated in the exposure amount calculating unit 9. Then, the frame exposure amount calculating unit 10 adds the absolute gain ga401 to the relative gains gr401 to gr405, and determines the values as the gains of the respective frames.

Then, the control unit 12 selects gr401+ga401 as the setting of the gain in the step st201 before the frame fr401 of FIG. 9D is imaged, and performs imaging with the selected setting of the gain, in the step st202. After that, similarly, the control unit 12 selects the setting of the gains illustrated in FIG. 9C, before the frames fr402 to fr405 are imaged, and performs the imaging for obtaining the gain correction value for each row in the steps st201 and st202. In FIGS. 9A to 9J, the number of the exposure calculation frame is 5, and after the control unit 12 has completed the imaging of the frames fr401 to fr405 of FIG. 9D in the step st203, the exposure amount calculating unit 9 obtains difference between exposure amounts of rows, in the step st204. Specifically, the exposure amount calculating unit 9 subtracts a spatial-frequency component of the average luminance of each row per unit of a frame, from the average luminance of each row, which is illustrated in FIG. 9E, and determines the difference between the exposure amounts of each row, which is illustrated in FIG. 9F. Subsequently, in the step st205, the exposure amount calculating unit 9 obtains the exposure amount ea401 illustrated in FIG. 9F, as the exposure amount of the frame of the peak exposure amount fr403. Then, in the step st206, the row-by-row gain correcting unit 21 calculates the gain correction value of each row in each frame, which is illustrated in FIG. 9G, from the difference between exposure amounts of each row, which has been obtained in the step st204. In the exposure amount ea401 of the peak frame fr403, the gain is equivalent to 1.

Subsequently, an operation of the main imaging and an operation of correcting the gain per each row by using the gain correction value of each row after the main imaging has been finished will be described. In the step st207, the frame exposure amount calculating unit 10 calculates the accumulation period and the gain of each imaging frame per unit of exposure amount calculation processing, from the difference between frame exposure amounts, which has been obtained in the step st108, and from the exposure amount of the peak frame, which has been obtained in the step st205. Then, in the step st208, the control unit 12 selects the settings of the accumulation period and the gain for each frame, which have been calculated in the step st207, and performs the main imaging in the step st209.

The horizontal scanning unit 6 transfers the image data which has been obtained by the main imaging, to the row-by-row gain correcting unit 21. In the step st210, the row-by-row gain correcting unit 21 corrects the gain per unit of the row, with the gain correction value of each row in each frame, which has been calculated in the step st206. Then, in the step st211, the image processing unit performs various types of image processings for the images in which the gains have been corrected per unit of the row.

One example of operations of the steps st207 to st211 will be described in more detail with reference to FIGS. 9A to 9J. FIG. 9H illustrates the images of the result in which the gains have been corrected per each row by using the gain correction values of FIG. 9G, FIG. 9I illustrates the average luminance of each row after the gains have been corrected per each row, and FIG. 9J illustrates the exposure amount of each row, in which the spatial-frequency component has been subtracted from the values in FIG. 9I and the gains have been corrected per each row.

In the step st207, in a similar way to the step st110, the frame exposure amount calculating unit 10 calculates the absolute gain ga402 illustrated in FIG. 9C, from the exposure amount of the frame of the peak exposure amount. Then, the frame exposure amount calculating unit 10 adds the absolute gain ga402 to the relative gains gr401 to gr405, and determines the values as the gains of the respective frames.

Then, the control unit 12 selects gr401+ga402 as the setting of the gain in the step st208 before the frame fr406 of FIG. 9D is imaged, and performs imaging with the selected setting of the gain in the step st209. The horizontal scanning unit 6 transfers the image data of the frame fr406 to the row-by-row gain correcting unit 21. In the step st210, the row-by-row gain correcting unit 21 corrects the gain per unit of the row with the gain correction value of each row in each frame, which is illustrated in FIG. 9G and has been calculated based on the exposure data of the frames fr401 to fr405. After that, similarly, the control unit 12 performs the imaging of the frames fr407 to fr410, and obtains the frames fr406' to fr410' of the images illustrated in FIG. 9H, in which the gains have been corrected per unit of the row. The exposure amounts of each frame and each row of these frames fr406' to fr410' become constant as are illustrated in FIGS. 9I and 9J.

Finally, an operation of the automatic exposure control for every number of the exposure amount calculation frame will be described below. After the imaging of the number of the exposure amount calculation frames has been completed in the step st212, the exposure amount calculating unit 9 obtains the exposure amount of the frame of the peak exposure amount from the image data obtained after the imaging has been completed, in the step st213. Then, in the step st207, the frame exposure amount calculating unit 10 calculates the accumulation period and the gain of each frame per unit of exposure amount calculation processing. Then, in the step st208, the control unit 12 selects the settings of the accumulation period and the gain for each frame, which have been calculated in the step st110, and performs the main imaging in the step st209. Then, in the step st210, the row-by-row gain correcting unit 21 corrects the gains of each row in each frame. Then, in the step st211, the image processing unit 11 performs various types of image processings. The operation will be described in more detail with reference to FIGS. 9A to 9J.

When the imaging of 5 frames of the frames fr406 to fr410 illustrated in FIG. 9D, which are the number of the exposure amount calculation frames, has been completed in the step st212, the exposure amount calculating unit 9 obtains the exposure amount ea402 of the frame of the peak exposure amount fr408, in the step st213. Then, in the step st207, the frame exposure amount calculating unit 10 calculates the accumulation period and the gain of each frame, and obtains the absolute gain ga403 illustrated in FIG. 9C. Then, the control unit 12 performs the imaging of the frames fr411 to fr415 with the setting of the gains to which the relative gains gr401 to gr405 have been added, in the steps st208 and st209. Then, in the step st210, the row-by-row gain correcting unit 21 corrects the gains per unit of the row as describe above, and obtains the frames fr411' to fr415'.

As has been described above, the solid-state imaging apparatus according to the second embodiment of the present invention has a periodic (exposure) gain adjusting device for the periodic change (flicker) of the luminance of the light source, and also has an automatic exposure unit which operates per unit of the cycle. Furthermore, the solid-state imaging apparatus has the row-by-row exposure adjusting unit per unit of a row. Thereby, it becomes easy to reduce the influence of the flicker within a frame plane, even in moving images that are imaged with such a high frame rate as to read out the plurality of images within the flicker cycle.

Third Embodiment

The solid-state imaging apparatus according to a third embodiment of the present invention adjusts the exposure stepwise with respect to a non-periodic change of light source luminance unlike the first embodiment, and reduces the change of the exposure amounts among the frames. The third embodiment of the present invention will be described mainly on points which are different from those in the first embodiment, with reference to the drawings.

The configuration of the solid-state imaging apparatus according to the third embodiment of the present invention is similar to the configuration of the solid-state imaging apparatus according to the first embodiment, which is illustrated in FIG. 1. The operations of the present embodiment are different from those in the first embodiment, and one of the examples will be described with reference to a flow chart in FIG. 10A to FIG. 11E.

In a step st101, the control unit 12 obtains an image for determining the existence or non-existence of the flicker, similarly to the first embodiment. Next, in a step st102, an exposure amount calculating unit 9 obtains the flicker frequency. Next, in a step st103, the exposure amount calculating unit 9 determines the existence or non-existence of the flicker. When there has been the flicker, the operations after the step st104 are performed. Steps st104 to st115 are similar to those in the first embodiment, and the description will be omitted.

When there has been no flicker, the operations are different from those in the first embodiment. Firstly, in a step st301, the exposure amount calculating unit 9 determines the number of the frames with which the exposure amount calculating unit 9 performs the exposure amount calculation processing. The number of the frames with which the exposure amount calculating unit 9 performs the exposure amount calculation processing can be determined so as to spend the minimum period processable for the exposure amount calculating unit 9, in other words, so as to be the processable minimum number of the frames, in order to reduce the time lag in the automatic exposure control which will be described later.

Subsequently, the imaging for calculating the initial exposure amount, which is performed in advance of the main imaging, and the operations of obtaining the exposure amount and calculating the exposure correction amount will be described below. In steps st302 and st303, the control unit 12 repeats the imaging for calculating the initial exposure amount, and performs the imaging of the number of the frames, which has been determined in the step st301. Then, in a step st304, the exposure amount calculating unit 9 obtains an exposure amount of a part of the imaging frames, out of the images which have been obtained in the step st302. In a step st305, the exposure amount calculating unit 9 calculates the exposure correction amount from the difference between the exposure amount and a target exposure amount. One example of operations of the steps st301 to st305 will be described in more detail below with reference to FIGS. 11A to 11E.

FIG. 11A illustrates a change of the light source luminance, FIG. 11B illustrates a vertical synchronizing signal to be input into the timing generator unit 7, FIG. 11C illustrates gains to be used at the time of imaging, and FIG. 11D illustrates the images which are output from the horizontal scanning unit 6. In addition, FIG. 11E illustrates area mean exposure amounts of output images.

Firstly, in the step st301, the exposure amount calculating unit 9 determines the number of the frames of the exposure amount calculation processing from a period and a frame rate which are necessary for the exposure amount calculation. The number of the frames of the exposure amount calculation processing is set at four frames in FIGS. 11A to 11E. Next, in the step st302, the control unit 12 performs the imaging for calculating the initial exposure amount. An accumulation period which is not illustrated in FIGS. 11A to 11E are set at the maximum value within the imaging frame rate, and the imaging is performed with a gain ga501 illustrated in FIG. 9C. Then, the control unit 12 performs the imaging of four frames fr501 to fr504 while the accumulation period and the gain are fixed.

Subsequently, in the step st304, the exposure amount calculating unit 9 obtains the absolute area mean exposure amount of the last frame fr504 of the four frames which are a unit of the exposure amount calculation processing. In the step st305, the exposure amount calculating unit 9 determines the deficient exposure amount when the target exposure amount is set at e500 in FIG. 11E, in other words, determines the exposure correction amount ec504.

In order to reduce the time lag in the exposure control which will be described later, the frame to be used for the exposure amount calculation is desirably the last frame or a frame close to the last frame in terms of a period of time, out of a plurality of frames which are the unit of the exposure amount calculation processing.

Subsequently, the calculation of the exposure amounts of each frame in the number of the exposure amount calculation frames, which are applied to the main imaging, and an operation of the main imaging will be described below. In the step st306, the frame exposure amount calculating unit 10 calculates an accumulation period and a gain of each frame in the number of the exposure amount calculation frames which are to be imaged next time, from the exposure correction amount, and from the accumulation period and the gain obtained when having obtained the exposure correction amount. Then, in the step st307, the control unit 12 selects the settings of the accumulation period and the gain for each frame, which have been calculated in the step st306, and performs the main imaging in the step st308. One example of operations of the steps st306 to st308 will be described in more detail below with reference to FIGS. 11A to 11E.

In the step st306, the frame exposure amount calculating unit 10 obtains a target gain gt508 in a frame fr508 by the calculation from an exposure correction amount ec504 and a gain ga504 obtained when having obtained the exposure correction amount. Furthermore, the frame exposure amount calculating unit 10 determines gains of the frames fr505 to fr508 from the gains ga504 to gt508 by a linear interpolation method, and obtains the gains ga505 to ga508. Then, the control unit 12 selects the gain ga505 in the step st307, and performs the imaging of the frame fr505 in the step st308. After this, similarly, the control unit selects the gains ga506 to ga508, and performs the imaging of the frames fr506 to fr508.

Finally, an operation of the automatic exposure control for every number of the exposure amount calculation frame will be described below. After the imaging of the number of exposure calculation frames has been completed in a step st309, the exposure amount calculating unit 9 obtains the exposure amount from a part of the imaging frames of the images obtained after the imaging has been completed in a step st304. Furthermore, the exposure amount calculating unit 9 calculates the exposure correction amount in the step st305, and calculates the accumulation period and the gain of each frame from the exposure correction amount, in the step st306. Then, the control unit 12 selects the settings of the accumulation period and the gain for each frame in the step st307, and performs the main imaging in the step st308. These steps are repeated in every number of the exposure amount calculation frames, and thereby the automatic exposure control is performed. One example of operations of the automatic exposure control will be described with reference to FIGS. 11A to 11E.

In the step st309, if the control unit 12 has determined that the imaging of the four frames which are the number of the exposure amount calculation frames has been completed, the exposure amount calculating unit 9 obtains the area mean exposure amount of the last frame fr508 out of the four frames, in the step st304. If the luminance of the light source is constant, the gains are corrected from the exposure amount of the frame fr504, and the exposure amount matches the target exposure amount. However, as is illustrated in FIG. 11A, the luminance of the light source greatly increases while the frame fr507 is imaged. As a result, as is illustrated in FIG. 11E, the exposure amount of the frame fr508 greatly exceeds the target exposure amount e500, and an output image becomes an overexposed image. Then, in the step st305, the exposure amount calculating unit 9 calculates the exposure correction amount ec508 for correcting the exposure amount into the target exposure amount e500. Then, in the step st306, the frame exposure amount calculating unit 10 calculates the gains of frames fr509 to fr512 which are to be imaged next time. When the luminance of the light source of the frame fr512 is equal to that of the frame fr508, the control unit 12 lowers stepwise the gains ga509 to ga512 in the frames fr509 to fr512 so that the exposure amount of the frame fr512 reaches the target exposure amount, in the step st307. Then, in the step st308, the control unit 12 performs the imaging of the frames fr509 to fr512 with the gains ga509 to ga512.

However, as is illustrated in FIG. 11A, the luminance of the light source continuously increases even while the frames fr509 to fr512 are imaged. As a result, the area mean exposure amount of the frame fr512 which is obtained in the step st304 still exceeds the target exposure amount e500. Then, the exposure amount calculating unit 9 and the frame exposure amount calculating unit 10 further lower the gains of the frames fr513 to fr516 which are to be imaged next time, in the steps st305 and st306.

As is illustrated in FIG. 11A, the luminance of the light source becomes approximately constant after the frame fr512. As the result, the area mean exposure amounts of the images of the frames fr513 to fr516 which have been imaged in the steps st307 and st308 converge on the target exposure amount e500.

In the above description, one example of controlling the exposure amount only by the control of the gain has been shown for the sake of simplifying the description, but it is also acceptable to control the exposure amount only by the control of an accumulation period. Alternatively, it is also acceptable to control the exposure amount by using both of the control of the accumulation period and the control of the gain.

As has been described above, the solid-state imaging apparatus according to the third embodiment of the present invention has the stepwise exposure-adjusting unit with respect to a non-periodic change of the light source luminance, and also has an automatic exposure unit which operates per unit of the plurality of frames. Thereby, the automatic exposure control is enabled even when images are photographed with a high frame rate, without depending on the capability of exposure amount calculation processing. In addition, even when images which have been photographed with the high frame rate are reproduced slowly, the images are adequate, because the change of the exposure amount among the frames is little.

The solid-state imaging apparatus according to the first to third embodiments can be applied to various applications such as a video camera, a camera for a mobile terminal, a vehicle-mounted camera, a camera for security and a camera for industrial use.

Note that the above embodiments are merely examples how the present invention can be practiced, and the technical scope of the present invention should not be restrictedly interpreted by the embodiments. In other words, the present invention can be practiced in various ways without departing from the technical concept or main features of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-203195, filed Sep. 14, 2012, which is hereby incorporated by reference herein in its entirety.

What is claimed is:

1. A solid-state imaging apparatus comprising:
a pixel unit configured to perform imaging of a plurality of frames by photoelectric conversion;

an exposure amount calculating unit configured to calculate, as one unit, exposure amounts of a plurality of frames imaged in a period during which a light source luminance is changing; and a control unit configured to, based on the exposure amounts of the plurality of frames, set a plurality of amplifying gains including at least two gains different from each other to control exposure amounts of a plurality of other frames to be imaged after imaging the plurality of frames used in a calculation of the exposure amounts.

2. The solid-state imaging apparatus according to claim 1, wherein the exposure amount calculating unit obtains an exposure amount of the frame having a peak exposure amount among those of the plurality of frames used in the calculation, and calculates a difference between the exposure amounts of the plurality of frames used in the calculation and the exposure amount of the frame having the peak exposure amount.

3. The solid-state imaging apparatus according to claim 1, wherein the exposure amount calculating unit calculates an exposure amount of each of the plurality of other frames, and the control unit controls an exposure amount of an each row in each of the frames.

4. The solid-state imaging apparatus according to claim 1, wherein the exposure amount calculating unit detects whether or not a periodic change of luminance of light source occurs, based on the exposure amounts of the plurality of frames used in the calculation, and when no periodic change occurs in the luminance of light source, the control unit controls the exposure amounts of the plurality of other frames based on the exposure amounts of the plurality of frames used in the calculation.

5. The solid-state imaging apparatus according to claim 1, wherein the plurality of frames on which the exposure amount is calculated are imaged with a frame rate that is higher than the flicker frequency of the light source.

6. The solid-state imaging apparatus according to claim 1, wherein the control unit performs the exposure amount calculation processing once for the N frames.

7. The solid-state imaging apparatus according to claim 1, wherein the control unit further sets, based on the exposure amount of the plurality frames, a plurality of charge accumulation periods including at least two periods different from each other to control the exposure amounts of the plurality of other frames to be imaged after imaging the plurality of frames used in the calculation of the exposure amounts.

8. The solid-state imaging apparatus according to claim 2, further comprising:

a frame exposure amount calculating unit configured to set the plurality of charge accumulation periods and/or the plurality of amplifying gains to control the exposure amounts of other frames, based on the difference between the exposure amounts of the plurality of frames used in the calculation and the exposure amount of the frame having the peak exposure amount.

9. A driving method of a solid-state imaging apparatus Comprising:

a pixel unit configured to perform imaging of a plurality of frames by photoelectric conversion, the method comprising:

calculating, as one unit, exposure amounts of a plurality of frames imaged in a period during which a light source luminance is changing; and based on the exposure amounts of the plurality of frames, setting a plurality of amplifying gains including at least two gains different from each other to control exposure amounts of a plurality of other frames to be imaged after imaging the plurality of frames used in a calculation of the exposure amounts.

10. The driving method of a solid-state imaging apparatus according to claim 9, wherein the method further comprises setting, based on the exposure amounts of the plurality of frames, a plurality of charge accumulation periods including at least two periods different from each other to control the exposure amounts of the plurality of other frames to be imaged after imaging the plurality of frames used in the calculation of the exposure amounts.

* * * * *